(12) United States Patent
Brough et al.

(10) Patent No.: US 6,349,756 B1
(45) Date of Patent: Feb. 26, 2002

(54) PEEL ASSEMBLY FOR A PRINTER

(75) Inventors: James M. Brough, Chicago; Dane Watkins, Evanston, both of IL (US)

(73) Assignee: ZIH Corporation, Wilmington, DE (US)

( * ) Notice: Subject to any disclaimer, the term of this patent is extended or adjusted under 35 U.S.C. 154(b) by 0 days.

(21) Appl. No.: 09/425,153

(22) Filed: Oct. 21, 1999

Related U.S. Application Data
(60) Provisional application No. 60/105,358, filed on Oct. 23, 1998.

(51) Int. Cl.[7] .................................................. B32B 35/00
(52) U.S. Cl. ........................ 156/584; 156/247; 156/344; 156/541
(58) Field of Search .................... 156/247, 249, 156/344, 584, 541; 271/280, 281, 285

(56) References Cited

U.S. PATENT DOCUMENTS

| | | |
|---|---|---|
| 2,602,719 A | 7/1952 | Thiene et al. |
| 3,330,207 A | 7/1967 | De Man |
| 3,415,706 A | 12/1968 | Ettre |
| 3,468,739 A | 9/1969 | Schrotz |
| 3,530,028 A | 9/1970 | Messmer |
| 3,586,578 A | 6/1971 | Dickerson |
| 3,941,278 A | 3/1976 | Oglander et al. |
| 4,435,243 A | 3/1984 | Azeez et al. |
| 4,560,087 A | 12/1985 | Sato et al. |
| 4,626,313 A | 12/1986 | Karp |
| 4,826,558 A | 5/1989 | Wada et al. |
| 5,009,739 A | 4/1991 | Goodwin et al. |
| 5,040,461 A | 8/1991 | Van-Ocker |
| 5,108,534 A | 4/1992 | Tveit et al. |
| 5,169,474 A | 12/1992 | Binder |
| 5,209,374 A | 5/1993 | Seidl-Lichthardt |
| 5,395,174 A | 3/1995 | Koch et al. |
| 5,427,460 A | 6/1995 | Kajiya |
| 5,478,428 A | 12/1995 | Carpenter |
| 5,482,899 A * | 1/1996 | McKenna et al. ...... 156/344 X |
| 5,520,776 A | 5/1996 | Van Allen et al. |
| 5,658,416 A | 8/1997 | MacCollum et al. |
| 5,713,679 A | 2/1998 | Taylor |
| 5,716,492 A | 2/1998 | Li |
| 5,718,525 A | 2/1998 | Bruhnke et al. |
| 5,730,816 A | 3/1998 | Murphy |
| 5,800,669 A | 9/1998 | Goodwin et al. |

* cited by examiner

*Primary Examiner*—Mark A. Osele
(74) *Attorney, Agent, or Firm*—Trexler, Bushnell, Giangiorgi, Blackstone & Marr, Ltd.

(57) ABSTRACT

A peel assembly is provided for separating a label from a releasable backing. The peel assembly includes a housing, structure for driving the backing and labels through the housing, a peel bar for bending the backing therearound, a plurality of deflector rollers proximate to the peel bar for deflecting the backing away from the label and towards the peel bar, and a plurality of supporting rollers proximate to the deflector rollers for supporting the label as it exits the peel assembly. After the backing, which has the labels thereon, passes over the peel bar, the backing is passed between the peel bar and the deflector rollers and the label passes over the deflector rollers and then over the supporting rollers.

6 Claims, 6 Drawing Sheets

PEEL ASSEMBLY FOR A PRINTER

This application claims the filing date of provisional patent application Ser. No. 60/105,358, filed on Oct. 23, 1998 and entitled "Peel Assembly For A Printer".

BACKGROUND OF THE INVENTION

This invention is generally directed to a peel assembly for a printer. More particularly, the invention contemplates a peel assembly for separating labels from a releasable liner or backing.

In a printer, if a media having labels on a backing is provided for carrying the indicia, the labels may be separated or peeled off of the backing by the printer instead of dispensing the label on the backing and requiring that the user hand strip the label. Prior art methods of separating a label from a backing pulls the media with high tension, approximately sixteen pounds of pull force, which performed well for separating the labels from the backing, but which can cause printing registration problems and rewind control of the backing can be difficult. Another prior art method scrapes the label off the backing by squeezing a sharp edge or pick against the backing which was pressed tightly against the platen roller without high tension on the backing.

The present invention provides a novel peel system which is used to separate or peel the labels easily from the backing with low tension on the backing. In the present invention, this simplifies peeling, makes label printing registration easier to control, reduces the tension required on the backing which makes rewinding of the backing easier, and reduces cost.

Other features and advantages of the present invention will become apparent upon a reading of the attached specification, in combination with a study of the drawings.

OBJECTS AND SUMMARY OF THE INVENTION

A general object of the present invention is to provide a printer which includes a novel peel system that is used to separate or to peel the labels from a releasable liner or backing.

Another object of the present invention is to provide a printer which includes a novel peel system that is used to separate or to peel the labels easily from the backing with low tension on the backing.

Briefly, and in accordance with the foregoing, the present invention discloses a novel peel assembly for separating a label from a releasable liner or backing. The peel assembly can be used on a printer. The peel assembly includes a housing, structure for driving the backing and labels through the housing, a peel bar for bending the backing therearound, a plurality of deflector rollers proximate to the peel bar for deflecting the backing away from the label and towards the peel bar, and a plurality of supporting rollers proximate to the deflector rollers for supporting the label as it exits the peel assembly. After the backing, which has the labels thereon, passes over the peel bar, the backing is passed between the peel bar and the deflector rollers and the label passes over the deflector rollers and then over the supporting rollers.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
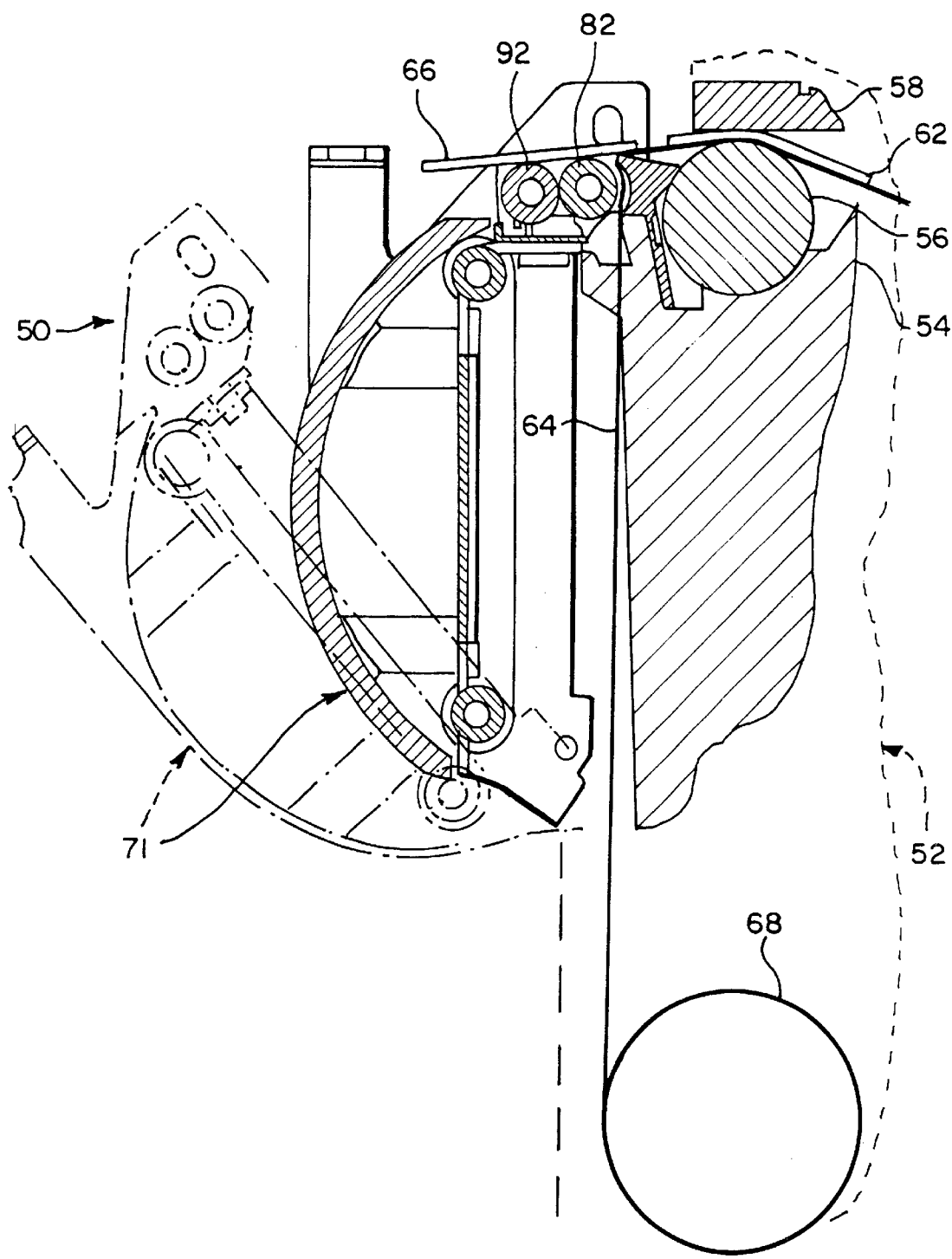
FIG. 1 is a cross-sectional view of a printer, which incorporates the features of a first embodiment of a peel bar therein and showing the closed position of the peel assembly in full line and showing the open position of the peel assembly in phantom line.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

With reference to FIG. 1, a novel peel assembly 50 which incorporates the features of the present invention is shown attached to a printer assembly 52. The printer assembly 52 can be made in accordance with the prior art and includes a housing in which the components of the printer assembly 52 are housed. A support casting 54 is mounted on the housing for rotatably mounting a platen roller 56 thereon, and a printhead means 58 mounted on the support casting 54. The remainder of the printer assembly 52 is well known in the prior art and is not described here.

A media 62, on which indicia and/or images are printed on by the printhead means 58, includes a releasable liner or backing 64 to which a plurality of labels 66 are releasably attached. The platen roller 56 is rotated by suitable driving means (not shown) to drive the media 62 beneath printhead means 58 such that the media 62 passes between the printhead means 58 and the platen roller 56. The printhead means 58 places indicia or an image on the label 66 in a known manner as the label 66 passes thereunder. As the media 62 is further advanced by the driven platen roller 56 such that the media 62 exits from between the printhead means 58 and the platen roller 56, the printed-on media 62 passes through the peel assembly 50 of the present invention such that the labels 66 are separated from the releasable backing 64 as described herein, and is rewound onto take-up spindle 68. The take-up spindle 68 is driven by driving means (not shown) and is rotated at the same rate of rotation as the platen roller 56 such that a low tension, approximately one-half of a pound of pull force, and a constant tension, is exerted on the backing 64.

Attention is now invited to the specifics of the novel peel assembly 50 of the present invention. The peel assembly 50 includes a peel bar 70 which is fixedly mounted on the support casting 54 and proximate to the platen roller 56 and a label deflector and supporting assembly 71 which is pivotally mounted to a wall of the printer assembly 52 by suitable means, such as a bracket.

Figure 4:
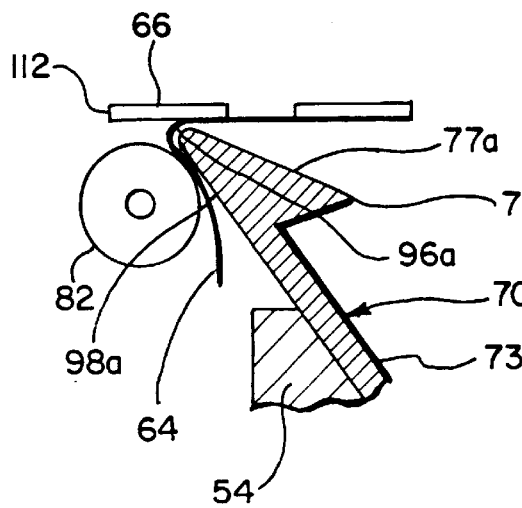
FIG. 4 is a partial cross-sectional view of the printer and the peel assembly, with a second embodiment of the peel bar mounted thereto and shown in cross-section.
Figure 5:
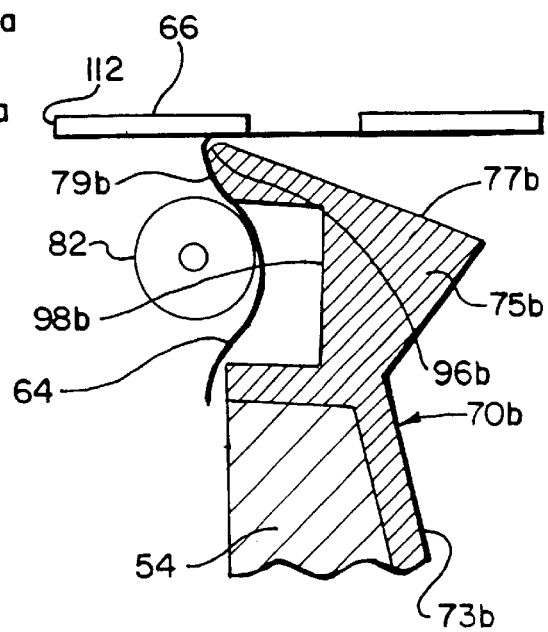
FIG. 5 is a partial cross-sectional view of the printer and the peel assembly, with a third embodiment of the peel bar mounted thereto and shown in cross-section.

A first embodiment of the peel bar 70 is shown in FIG. 1, a second embodiment of the peel bar 70*a* is shown in FIG. 4 and a third embodiment of the peel bar 70*b* is shown in FIG. 5. Like elements in each embodiment are denoted with like reference numerals with the like elements in the second embodiment having an "a" after the reference numeral and the like elements in the third embodiment having a "b" after the reference numeral.

In each embodiment, the peel bar 70, 70*a*, 70*b* is formed as a bar which has a lower portion 73, 73*a*, 73*b* that is secured to the support casting 54 and an upper portion 75, 75*a*, 75*b* which extends upwardly from the support casting 54. The peel bar 70, 70*a*, 70*b* is mounted close to the platen roller 56, but does not rest against the platen roller 56. An upper surface 77, 77*a*, 77*b* of the upper portion 75, 75*a*, 75*b* angles upwardly and outwardly as upper surface 77, 77*a*, 77*b* extends away from the platen roller 56, and an upper end of a front surface 79, 79*a*, 79*b* of the upper portion 75, 75*a*, 75*b* extends downwardly and toward the platen roller 56 such that a corner 96, 96*a*, 96*b* is defined at the juncture between the upper surface 77, 77*a*, 77*b* and the front surface 79, 79*a*, 79*b*. A relief 98, 98*a*, 98*b* is provided a predetermined distance below the corner 96, 96*a*, 96*b* for reasons described herein.

In the first embodiment, the relief 98 takes the form of a concave channel in the front surface 79 of the peel bar 70. In the second embodiment the relief 98*a* takes the form of an angled surface which is a direct continuation of the upper end of the front surface 79*a* of the peel bar 70*a*. In the third embodiment, the relief 98*b* takes the form of a generally U-shaped cutout in the front surface 79*b* of the peel bar 70*b*.

Attention is now invited to the specifics of the label deflector and supporting assembly 71.

First and second end caps 72, 74 are hingedly connected to the wall of the printer assembly 52 by suitable hinge means. The end caps 72, 74 extend outwardly and generally perpendicularly relative to the wall of the printer assembly 52.

A support plate 81 is rigidly mounted between the end caps 72, 74 such that the end caps 72, 74 are at each end of the support plate 81. The support plate 81 includes a vertical portion 83 and a horizontal portion 85 at the upper end thereof such that an "L" shape is formed. A pair of spaced apart tabs 90 extend upwardly from the vertical portion 85 of the support plate 81 and each is spaced at a predetermined distance away from the sides of the respective end caps 72, 74. Each tab 90 has an aperture therethrough. The tabs 90 are also spaced a predetermined distance away from the rear ends of the respective end caps 72, 74.

An anti-static brush assembly 76 is mounted on the vertical portion 83 of the support plate 81 by suitable mounting means, such as screws. The anti-static brush assembly 76 includes an elongated vertical plate upon which a plurality of bristles extend upwardly therefrom. The bristles are provided along the front edge of the plate such that the bristles extend across the length of the plate. The plate is attached to the top of the vertical portion 85 of the support plate such that the line of bristles is proximate to, but are spaced apart from, the tabs 90.

A front housing member 78 is mounted to the front of the support plate 81 by suitable means, such as screws, and extends between the end caps 72, 74. The front housing member 78 is curved and is ribbed.

A first shaft 80 is mounted within respective apertures provided through the end caps 72, 74 at a rear end thereof such that the shaft 80 is mounted between the end caps 72, 74 and is spaced a predetermined distance away from the ribbed front housing member 78. The shaft 80 is constrained axially between the end caps 72, 74 and, in the preferred embodiment, is free to rotate relative to the end caps 72, 74. Alternately, the shaft 80 may be fixed relative to the end caps 72, 74.

A plurality of the ribbed rollers 82 are mounted on the shaft 80. The ribbed rollers 82 are separated from each other by a plurality of spacers 84 such that the ribbed rollers 82 are constrained axially relative to the end caps 72, 74 and relative to each other. The ribbed rollers 82 are free to rotate on the shaft 80.

Figure 8:
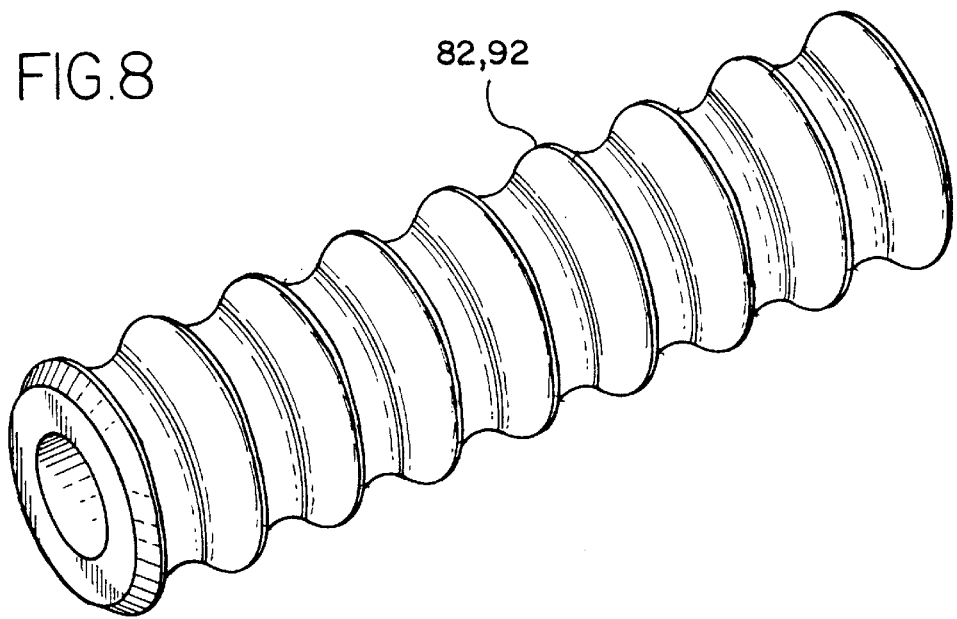
FIG. 8 is a perspective view of a roller used in the peel assembly of the present invention.
Figure 6:
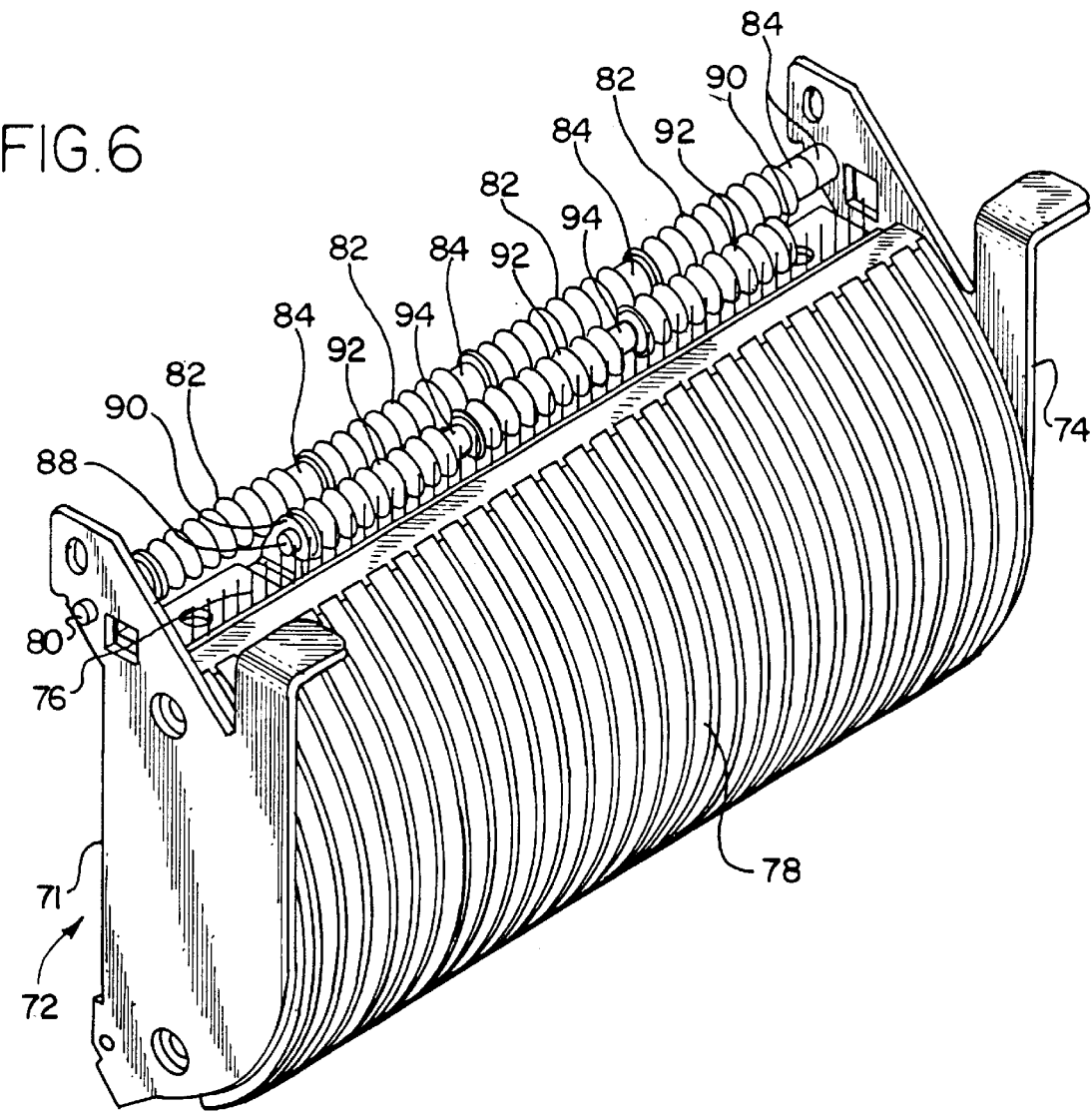
FIG. 6 is a perspective view of a portion of the peel assembly which can be opened and closed shown from the front side thereof.
Figure 7:
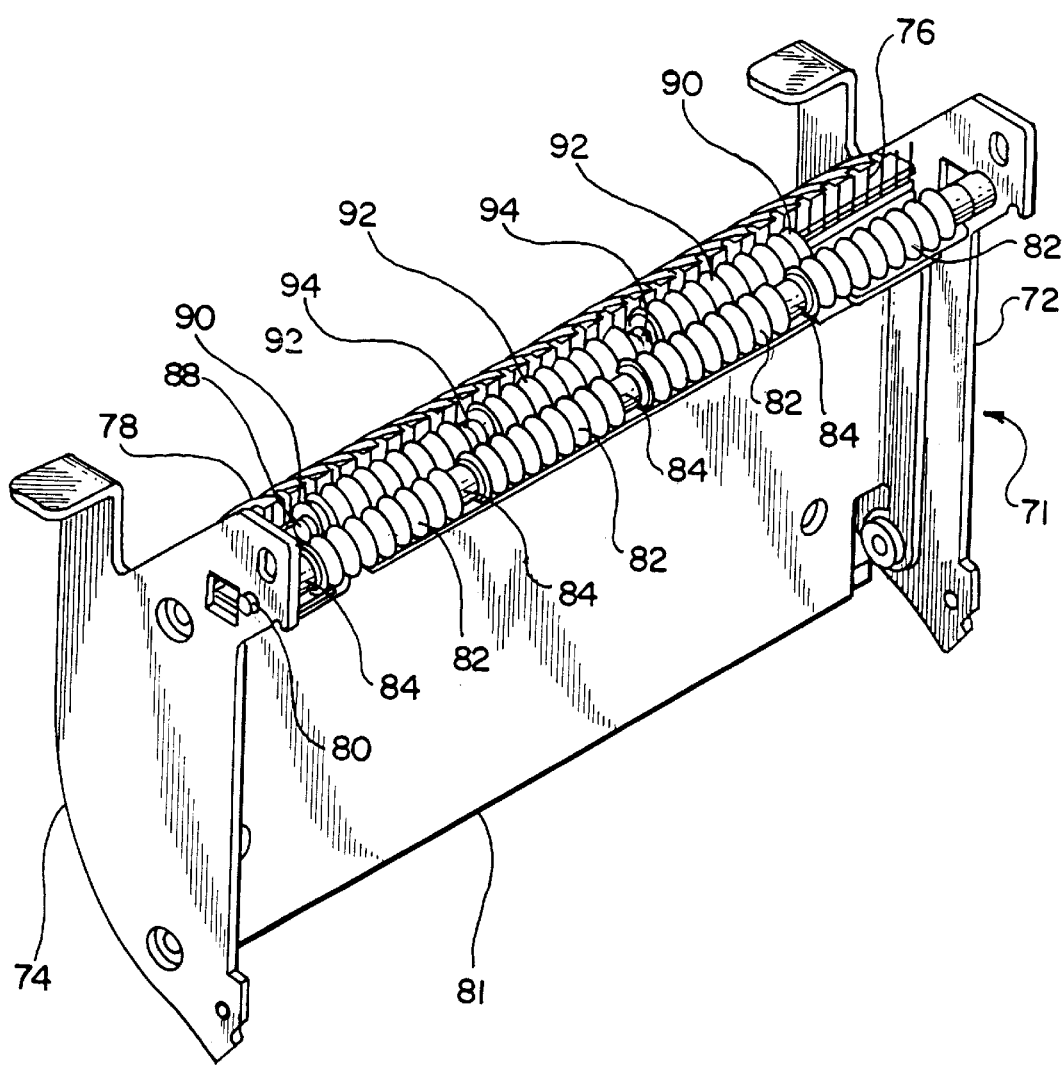
FIG. 7 is a perspective view of the portion of the peel assembly which can be opened and closed shown from the rear side thereof.

With reference to FIG. 8, each ribbed roller 82 has a surface geometry to minimize surface area contact with the label 66 as it passes thereover. It should be noted that each ribbed roller 82 could be broken into a larger number of smaller rollers or an equivalent structure formed of a plurality of individual rollers of alternating diameters. Such structures are intended to fall within the scope of the present invention.

A second shaft 88 is mounted to and between the tabs 90 on the support plate 81. The shaft 88 is constrained axially between the tabs 90.

A plurality of ribbed rollers 92 are mounted on the shaft 88. The ribbed rollers 92 are separated from each other by a plurality of compression springs 94 such that the ribbed rollers 92 are constrained axially relative to the tabs 90 and relative to each other. The compression springs 94 force the ribbed rollers 92 against the tabs 90, giving rise to a frictional force which opposes the free rotation of the ribbed rollers 92.

Each ribbed roller 92 is identical in construction to the rollers 82. Each ribbed roller 92 has a surface geometry which minimizes surface area contact with the label 66 as it passes thereover. Like rollers 82, it should be noted that each ribbed roller 92 could be broken into a larger number of smaller rollers or an equivalent structure formed of a plurality of individual rollers of alternating diameters. Such structures are intended to fall within the scope of the present invention.

As shown in the drawings, the ribbed rollers 82 and the ribbed rollers 92 are proximate to each other with the ribbed rollers 82 being forward of the ribbed rollers 92 with respect to the platen roller 56. The ribbed rollers 82, 92 do not come into contact with each other. In addition, as shown in the drawings, the bristles of the anti-static brush assembly 76 are rearward of the ribbed rollers 92 relative to the platen roller 56 and do not come into contact with the ribbed rollers 92.

The label deflector and supporting assembly 71 can be pivoted away from the wall of the printer assembly 52 and the support casting 54 as shown in phantom lines to feed the releasable backing 64 between the peel bar 70, 70*a*, 70*b* and the ribbed rollers 82. The peel bar 70, 70*a*, 70*b* is fixedly mounted on the support casting 54 and does not pivot.

When the label deflector and supporting assembly 71 is returned to the engaged position, the media 62 passes between the platen roller 56 and the printhead means 58 and over the upper surface 77, 77a, 77b of the peel bar 70, 70a, 70b. The ribbed rollers 82 are positioned proximate to and close to the peel bar 70, 70a, 70b such that a portion of each ribbed roller 82 is underneath the corner 96, 96a, 96b of the peel bar 70, 70a, 70b.

Figure 2:
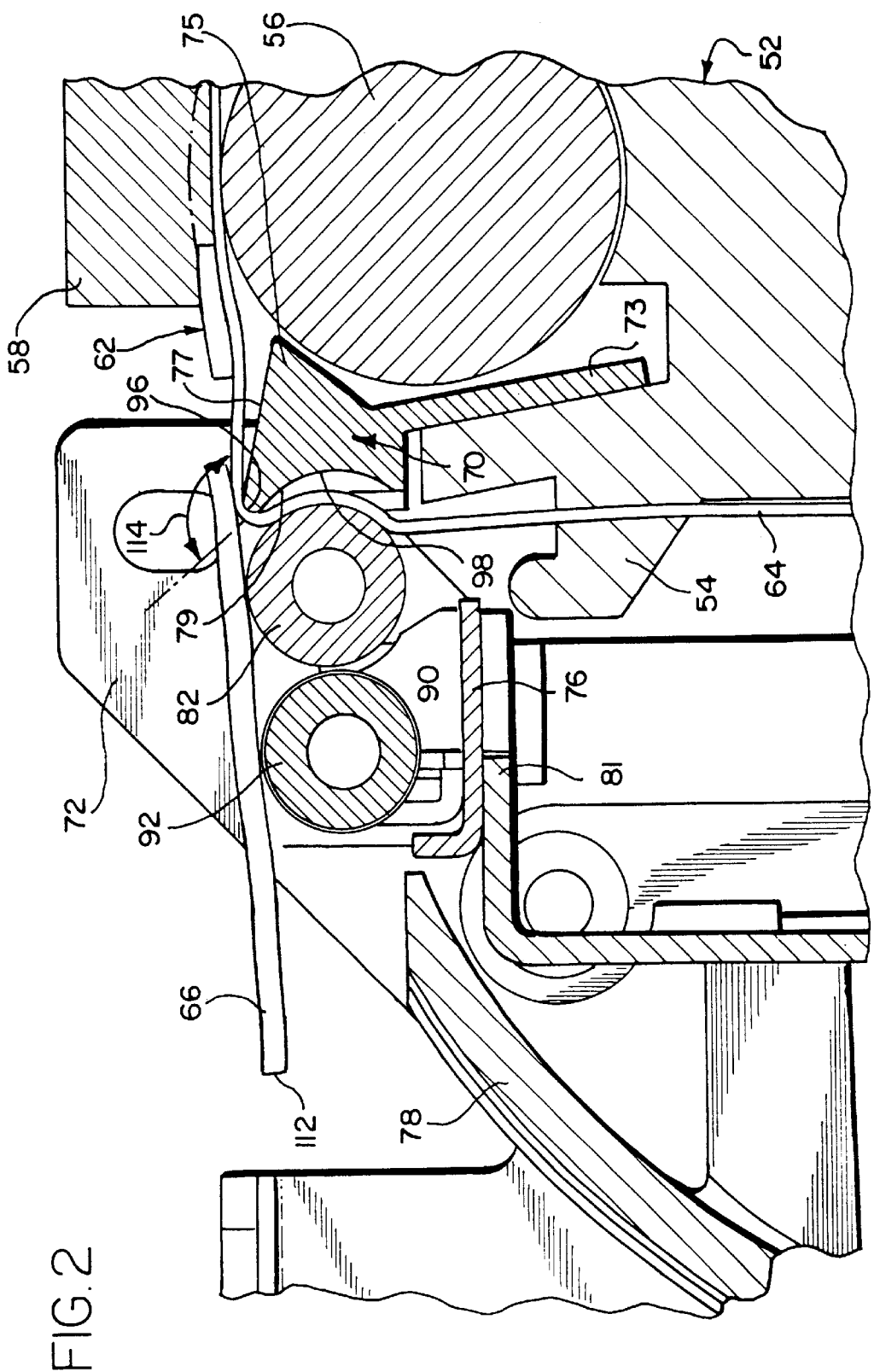
FIG. 2 is an enlarged, partial cross-sectional view of the printer.
Figure 3:
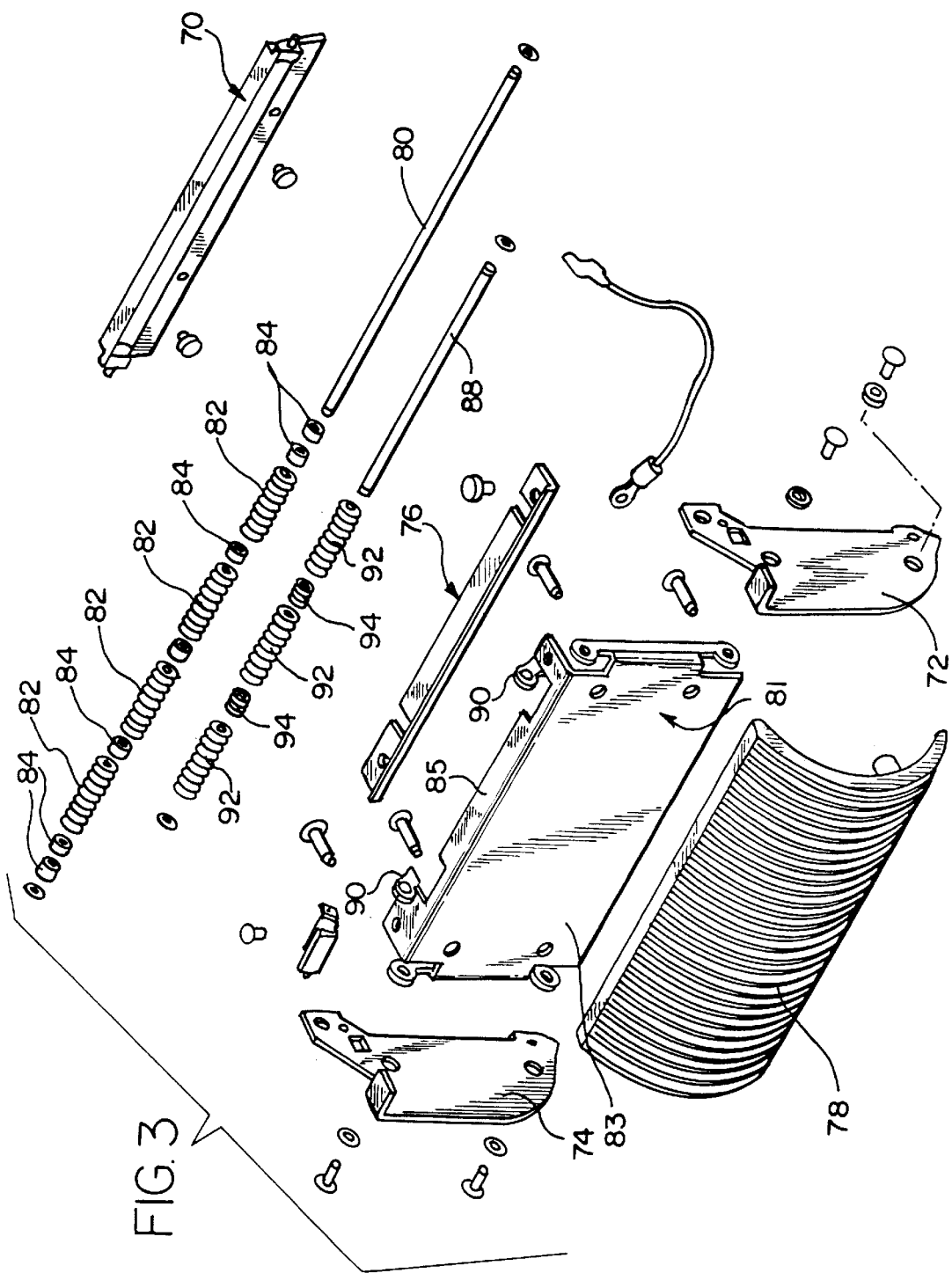
FIG. 3 is an exploded, perspective view of the components of the peel assembly.

As the media 62 is driven through the printer assembly 52 by the driven platen roller 56, the leading edge 112 of the label 66, and then the remainder of the label 66, is separated from the releasable backing 64 at the corner 96, 96a, 96b of the peel bar 70, 70a, 70b as the releasable backing 64 is bent around the corner 96, 96a, 96b of the peel bar 70, 70a, 70b. The releasable backing 64 then passes between the ribbed rollers 82 and the relief 98, 98a, 98b in the peel bar 70, 70a, 70b, which is immediately adjacent to the rollers 82. The rollers 82 deflect the releasable backing 64 in from the corner 96, 96a, 96b of the peel bar 70, 70a, 70b and into the relief 98, 98a, 98b. As a result of the provision of the relief 98, 98a, 98b and the deflection of the backing 64 therein by the rollers 82, the peel angle 114, the angle at which the backing 64 is relative to the label 66 at the point of separation, is increased, see FIG. 2, which assists in the initiation of the peeling and the continued separating the labels 66 away from the releasable backing 64. The rollers 82 are driven in an opposite direction to the direction of rotation of the platen roller 56 as a result of the friction between the backing 64 pressing against the rollers 82 in the gap between the rollers 82 and the peel bar 70, 70a, 70b. It is believed that rotation of the rollers 82 in a direction opposite to that of the peeled labels 66 results in reduced attachment of the peeled labels 66 to the rollers 82.

After the leading edge 112 of the label 66 is separated from the releasable backing 64, the label 66 slides across the ribbed rollers 82, which in the preferred embodiment rotate freely. The label 66 then slides across the ribbed rollers 92, which will not move unless contact force between the label 66 and the ribbed rollers 92 overcomes the frictional force between the ribbed rollers 92 and the tabs 90. This prevents the label 66 from binding as the label 66 slides over the ribbed rollers 92. Furthermore, the ribbed rollers 92 support the label 66, which prevents the label 66 from wrapping around the ribbed rollers 82. Because each ribbed roller 82, 92 has a surface geometry which is designed to minimize surface area contact with the label 66 as it passes thereover, this aids in preventing adhesive accumulation on the rollers 82, 92. The label 66 then passes over the bristles of the anti-static brush assembly 76 which is immediately adjacent to the ribbed rollers 92 and the anti-static brush assembly 76 discharges any static electricity created from the label 66 separation. Finally, the label 66 comes to rest on the ribbed front housing 78.

As a result of the low and constant tension applied to the backing 64 by rotation of the driven take-up spindle 68, the backing 64 is prevented from "looping" away from the corner 96, 96a, 96b of the peel bar 70, 70a, 70b. In addition, low tension, approximately one-half of a pound of pull force, on the backing 64 makes print registration easier then with high tension, approximately sixteen pounds of pull force, as is used in prior art systems. A low tension system is normally lower in cost than a high tension system because the rewind motor torque requirements are less than high tension systems. The low tension also makes backing 64 rewinding much easier to control than with a high tension system. Poor rewinding can affect print registration by pulling the backing 64 from side to side. This often happens in a high tension system unless the guides used therein are aligned with precision. The low tension system used in the present invention also allows the pressure across the peel bar 70, 70a, 70b to be optimized to obtain the best peel condition for peeling the labels 66 with little regard to system alignment because the handling of the backing 64 is much easier to control.

The peel assembly 50 of the present invention can easily be incorporated into existing printers. In addition, while the peel assembly 50 of the present invention is shown attached to a printer assembly 52, it is to be understood that the peel assembly 50 of the present invention can be used in a label dispenser for dispensing blank labels or pre-printed labels, in a label applicator, or in a label delaminator.

While preferred embodiments of the present invention are shown and described, it is envisioned that those skilled in the art may devise various modifications of the present invention without departing from the spirit and scope of the appended claims.

The invention claimed is:

1. A peel assembly for use in separating a label from a backing, the label when on the backing forming a media, said peel assembly comprising: a housing; means for applying tension to the backing and for driving the backing through said housing; peel means for bending the backing therearound; a relief under said peel means; deflector means proximate to said peel means for deflecting the backing away from the label and into said relief; and at least one roller proximate to said deflector means for supporting the label as the label exits the peel assembly; wherein when the media passes over said peel means, the backing passes between said peel means and said deflector means and the label passes over said deflector means.

2. A peel assembly as defined in claim 1, wherein said at least one roller is ribbed.

3. A peel assembly for use in separating a label from a backing, the label when on the backing forming a media; said peel assembly comprising: a housing; means for applying tension to the backing and for driving the backing through said housing; peel means for bending the backing therearound; at least one deflecting roller proximate to said peel means for deflecting the backing away from the label; a relief under said peel means; and at least one supporting roller proximate to said deflecting roller for supporting the label as the label exits the peel assembly, wherein when the media passes over said peel means, the backing passes between said peel means and said deflecting roller and the label passes over said deflecting roller and then over said supporting roller.

4. A peel assembly as defined in claim 3, wherein said at least one deflecting roller is ribbed and wherein said at least one supporting roller is ribbed.

5. A peel assembly as defined in claim 4, wherein said at least one deflector roller is rotatably mounted on a shaft.

6. A peel assembly for use in separating a label from a backing, the label when on the backing forming a media, said peel assembly comprising: a housing; means for applying tension to the backing and for driving the backing through said housing; peel means for bending the backing therearound; a relief under said peel means; and a freely rotatable roller proximate to said peel means for deflecting the backing away from the label and into said relief, wherein when the media passes over said peel means, the backing passes between the peel means and said roller and the label passes over said roller.

* * * * *

UNITED STATES PATENT AND TRADEMARK OFFICE
CERTIFICATE OF CORRECTION

PATENT NO. : 6,349,756 B1
DATED : February 26, 2002
INVENTOR(S) : James M. Brough and Dane Watkins It is certified that error appears in the above-identified patent and that said Letters Patent is hereby corrected as shown below:

<u>Column 6,</u>
Lines 45 and 62-63, "wherein when the" should be -- wherein the --

Signed and Sealed this

Seventeenth Day of August, 2004

JON W. DUDAS
*Acting Director of the United States Patent and Trademark Office*